E. F. SOUTHWORTH.
ETYMOLOGICAL CHART.
APPLICATION FILED MAY 13, 1911.

1,019,545.

Patented Mar. 5, 1912.

Witnesses
E. B. Watts
M. Decker

Inventor
Edward F. Southworth
By Delbert F. Decker
Attorney

UNITED STATES PATENT OFFICE.

EDWARD F. SOUTHWORTH, OF SYRACUSE, NEW YORK.

ETYMOLOGICAL CHART.

1,019,545.     Specification of Letters Patent.     Patented Mar. 5, 1912.

Application filed May 13, 1911. Serial No. 627,071.

*To all whom it may concern:*

Be it known that I, EDWARD F. SOUTHWORTH, a citizen of the United States, residing at Syracuse, in the county of Onondaga and State of New York, have invented certain new and useful Improvements in Etymological Charts, of which the following is a specification.

This invention relates to educational appliances, and particularly to one designed to serve as an aid in teaching etymology and orthography.

With this object in view the invention consists in the structure of parts and in their combination for the purpose specified, substantially as hereinafter set forth and claimed.

Figure 1:
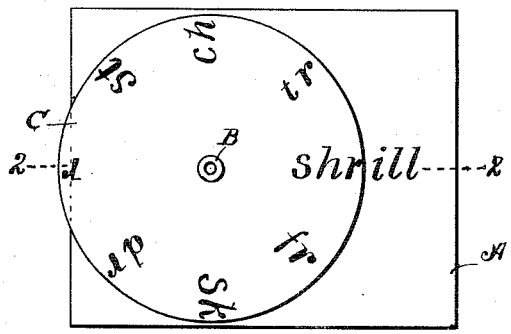
Figure 2:
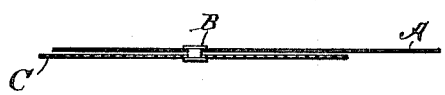
Figure 3:
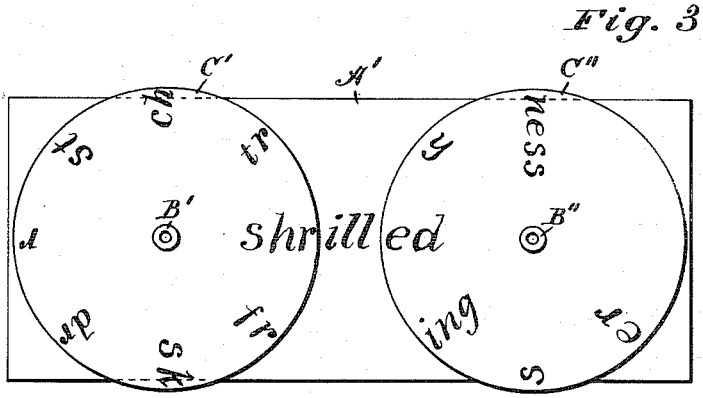

In the accompanying drawing which forms a part of this specification Figure 1 represents a simple form of the appliance involving the present invention; Fig. 2 represents a horizontal transverse section thereof taken in the line indicated at 2—2, Fig. 1; and Fig. 3 represents in elevation a modified form of the appliance seen in Fig. 1.

The present invention is intended to provide means whereby the various prefixes and suffixes may be readily added to the radical of a word and presented to young children in a manner to hold their attention and to impress the formation of words upon their minds.

In Fig. 1 the device consists of a base-piece A preferably of cardboard, upon which is journaled by an eyelet B a rotary disk C, also preferably of cardboard. Upon the base-piece at one edge of the disk may be located a part of a word or the radical upon which several words may be formed. Upon the disk is then radially located a number of prefixes which may be successively presented to the part of the word or radical located upon the base-piece.

The invention also contemplates the location of suffixes upon a rotary disk for successive presentation to the part of a word or radical located upon the base-piece.

In Fig. 3 the base-piece is indicated at A' and upon it are journaled by means of eyelets B' and B² rotary disks as C' and C². The prefixes are radially located upon the disk C', as shown, and the suffixes are radially located upon the disk C², as shown. The edges of these disks, as well as that of disk C, in Fig. 1, project beyond their respective base-pieces, so that the disks may be rotated by the application of the teacher's finger to the projecting edges thereof.

As will be seen by the movement of the disk C, in Fig. 1, any one of the prefixes on it may be brought into alinement with the part of the word or radical upon the base-piece, here represented as "ill" and the words "shrill," "frill," "skill," etc., produced in succession. With the device shown in Fig. 3 these same words may be presented in succession and the appropriate suffixes upon the disk C² added in succession.

The invention claimed is,—

In an educational appliance, the combination with a base-piece upon which at a definite point is located the radical of a word, a rotary disk journaled to said base-piece in a position such that its periphery is adjacent to the beginning of said radical and having located radially thereon prefixes for said radical, and another rotary disk journaled to said base-piece in a position such that its periphery is adjacent to the end of said radical and having located radially thereon suffixes for said radical, whereby on the rotation of said disks different words may be successively built up from said radical and said prefixes and suffixes.

In testimony whereof I have affixed my signature in presence of two witnesses.

EDWARD F. SOUTHWORTH.

Witnesses:
   A. V. FOWLER,
   JNO. B. TUCK.